United States Patent
Ford et al.

(10) Patent No.: US 10,512,924 B2
(45) Date of Patent: Dec. 24, 2019

(54) PORTABLE MISTING SYSTEM WITH COMBINED AIR/WATER NOZZLE ASSEMBLY

(71) Applicant: FRF Inc., Winter Springs, FL (US)

(72) Inventors: William J. Ford, Winter Springs, FL (US); Thomas C. Dula, III, Oviedo, FL (US)

(*) Notice: Subject to any disclaimer, the term of this patent is extended or adjusted under 35 U.S.C. 154(b) by 290 days.

(21) Appl. No.: 15/723,401

(22) Filed: Oct. 3, 2017

(65) Prior Publication Data

US 2018/0093283 A1   Apr. 5, 2018

Related U.S. Application Data

(60) Provisional application No. 62/403,298, filed on Oct. 3, 2016.

(51) Int. Cl.
| | | |
|---|---|---|
| *B05B 7/24* | (2006.01) | |
| *F24F 6/14* | (2006.01) | |
| *B05B 3/02* | (2006.01) | |
| *B05B 7/04* | (2006.01) | |
| *F24F 6/00* | (2006.01) | |
| *B05B 15/65* | (2018.01) | |
| *B05B 15/654* | (2018.01) | |

(52) U.S. Cl.
CPC ........... *B05B 7/2464* (2013.01); *B05B 3/022* (2013.01); *B05B 7/045* (2013.01); *F24F 6/14* (2013.01); *B05B 7/2489* (2013.01); *B05B 15/65* (2018.02); *B05B 15/654* (2018.02); *F24F 2006/008* (2013.01); *F24F 2006/146* (2013.01); *F24F 2221/12* (2013.01); *Y02B 30/545* (2013.01)

(58) Field of Classification Search
CPC ....... B05B 7/2464; B05B 3/022; B05B 7/045; B05B 7/2489; B05B 15/65; B05B 15/654; F24F 6/14; F24F 2006/008; F24F 2006/146; F24F 2221/12; Y02B 30/545
USPC ............................................ 261/28, 30, 78.2
See application file for complete search history.

(56) References Cited

U.S. PATENT DOCUMENTS

| | | | |
|---|---|---|---|
| 6,151,907 A | 11/2000 | Hale | |
| 6,293,121 B1* | 9/2001 | Labrador | ............... B01D 61/10 62/304 |
| 6,325,362 B1* | 12/2001 | Massey | ............... B60H 1/3202 261/127 |
| 6,338,472 B1* | 1/2002 | Shimazu | ............. B01F 3/04049 261/29 |
| 6,393,857 B1 | 5/2002 | Malueg | |

(Continued)

OTHER PUBLICATIONS

Aztek Nozzles: Product Overview: http://www.testors.com/product-catalog/testors-brands/aztek/accessories/nozzle/ retrieved from internet Oct. 3, 2017; pp. 1.

*Primary Examiner* — Charles S Bushey
(74) *Attorney, Agent, or Firm* — Allen, Dyer, Doppelt + Gilchrist, PA (57) ABSTRACT

A portable misting system includes a housing, an air pump carried by the housing to provide a flow of air, a water reservoir carried by the housing to hold a supply of water, and a water pump carried by the water reservoir to provide a flow of water droplets. An air/water nozzle assembly is carried by the housing and includes a nozzle body and a misting nozzle coupled to an output of the nozzle body. The nozzle body has an air input coupled to the air pump to receive the flow of air, and a water input coupled to the water pump to receive the flow of water droplets.

17 Claims, 7 Drawing Sheets

(56) References Cited

U.S. PATENT DOCUMENTS

| | | | | |
|---|---|---|---|---|
| 6,543,247 B2 * | 4/2003 | Strauss | ............... | A61F 7/00 |
| | | | | 261/116 |
| 7,448,604 B2 * | 11/2008 | Kim | ............... | H01L 21/67109 |
| | | | | 261/115 |
| 8,544,826 B2 * | 10/2013 | Ediger | ............... | F24F 6/12 |
| | | | | 261/30 |
| 9,033,316 B2 * | 5/2015 | Hansen | ............... | A47L 1/09 |
| | | | | 261/78.2 |
| 2007/0164459 A1 * | 7/2007 | Gottlieb | ............... | B05B 7/0458 |
| | | | | 261/78.2 |
| 2007/0170280 A1 * | 7/2007 | Ridgeway | ............... | B62J 99/00 |
| | | | | 239/146 |
| 2008/0237900 A1 * | 10/2008 | Junkel | ............... | F24F 5/0035 |
| | | | | 261/28 |
| 2015/0202639 A1 * | 7/2015 | Fenton | ............... | C08G 63/672 |
| | | | | 239/433 |

* cited by examiner

FIG. 11 ously controlled.

PORTABLE MISTING SYSTEM WITH COMBINED AIR/WATER NOZZLE ASSEMBLY

RELATED APPLICATIONS

This application claims the benefit of U.S. Provisional Application Ser. No. 62/403,298 filed Oct. 3, 2016, the entire contents of which are incorporated herein by reference.

TECHNICAL FIELD

The present disclosure relates to the field of cooling systems, and more particularly, to a portable misting system for outdoor environments.

BACKGROUND

In hot climates, people try various cooling techniques. Examples include staying in the shade and out of direct sunlight, using air conditioning systems, ventilation, etc. Misting systems have been used for air conditioning of outdoor environments. A misting system produces a fine mist of water. The mist enhances evaporative cooling on the skin of a person.

An example misting system for a vehicle, such as a golf cart, is disclosed in U.S. Pat. No. 6,151,907. The disclosed misting system has a reservoir for containing water and misting nozzles are in communication with the reservoir. Water is forced out of the reservoir and through the nozzles by compressed gas. The compressed gas can be supplied by an external air cylinder. The misting nozzles can be located in the wall of the reservoir.

Another example misting system is disclosed in U.S. Pat. No. 6,393,857. The disclosed misting system is also for a golf cart and includes a reservoir for holding a liquid, such as water. A pump is provided for pumping the liquid out of the reservoir. The pump is in liquid communication with the reservoir by a tube or by being mounted on the reservoir. A conduit assembly is provided for spraying the liquid from the reservoir to a position generally adjacent to the golfers in the cart. Activation of the pump diffuses a mist of the liquid over the golfers.

Even in view of the above noted misting systems, there is still a need to improve how the mist is provided by such systems.

SUMMARY

A portable misting system includes a housing, an air pump carried by the housing to provide a flow of air, a water reservoir carried by the housing to hold a supply of water, a water pump carried by the water reservoir to provide a flow of water droplets, and at least one air/water nozzle assembly carried by the housing. The air/water nozzle assembly may include a nozzle body and a misting nozzle coupled to an output of the nozzle body. The nozzle body may have an air input coupled to the air pump to receive the flow of air, and a water input coupled to the water pump to receive the flow of water droplets.

The portable misting system is for outdoor enthusiasts and may be used in a variety of different applications. The portable misting system advantageously has a compact design with flexible mounting. In addition, the air/water nozzle assembly is advantageously configured to have separate inputs for the air and water droplets so as to allow the density of the mist to be selectively controlled.

More particularly, the nozzle body may have a longitudinal axis extending therethrough, and may further include a water flow pathway, an air flow pathway, and a nozzle body chamber downstream from an end of the water and air flow pathways. The water flow pathway may extend from the water input to the longitudinal axis, and continue extending along the longitudinal axis to the nozzle body chamber. The air flow pathway may extend from the air input to the nozzle body chamber at an angle with respect to the longitudinal axis.

The misting nozzle may be coupled to the nozzle body via a misting nozzle opening. The misting nozzle may have an input extending to the nozzle body chamber of the nozzle body, and a restricted output extending from an external wall of the nozzle body.

The misting nozzle may be configured to provide a misting chamber where the flow of air comes in contact with the flow of water droplets so as to create a mist that is to pass through the restricted output of the misting nozzle.

The portable misting system may further include a mist controller carried by the housing to control a speed of the water pump. The mist controller advantageously allows the density of the mist to be selectively controlled.

The portable misting system may further include a vent carried by the housing, with the air/water nozzle assembly coupled to the vent. A fan may be carried by the housing to provide a flow of air to the vent that is separate from the flow of air from the air pump. A fan controller may be carried by the housing to control a speed of the fan. The fan controller is advantageously used to selectively control the amount of air forcing the mist out of the vent.

The portable misting system may further include a battery carried by the housing to power the air pump, water pump and fan, and a power switch may be carried by the housing and coupled to the battery.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternate embodiments.

Figure 1:
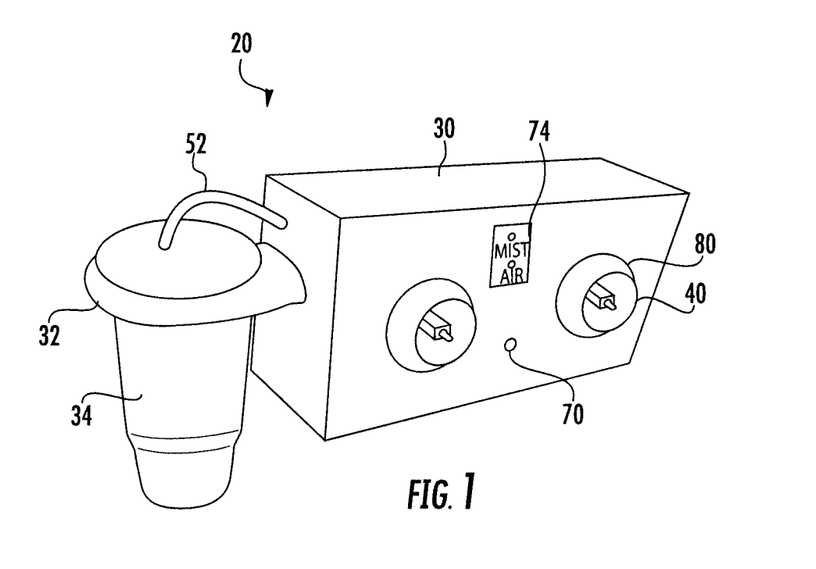
FIG. 1 is a front perspective view of a portable misting system with a pair of combined air/water nozzle assemblies in accordance with the present disclosure.
Figure 2:
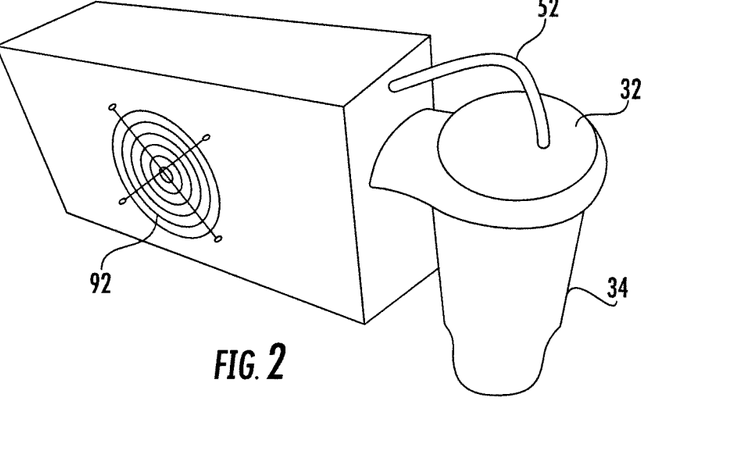
FIG. 2 is a rear perspective view of the portable misting system illustrated in FIG. 1.
Figure 3:
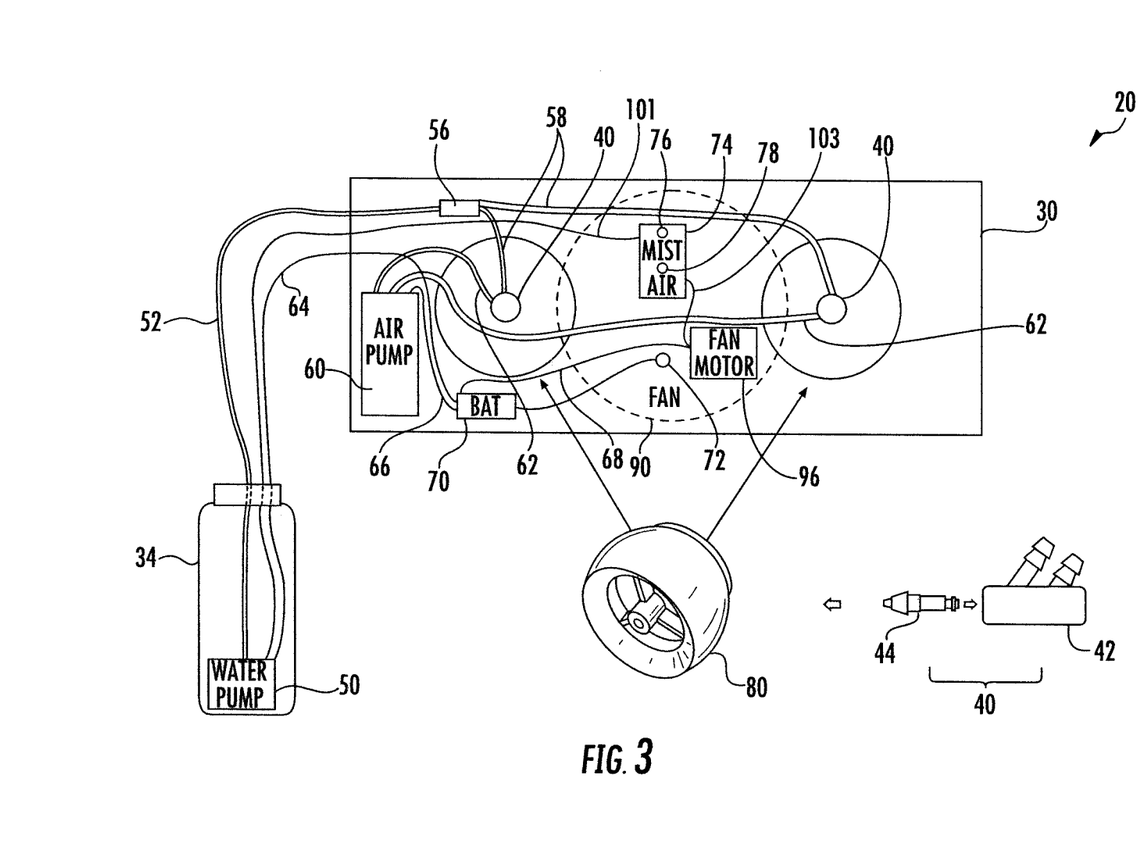
FIG. 3 is an exploded schematic view of the portable misting system illustrated in FIG. 1.

Referring initially to FIGS. 1-3, the illustrated portable misting system 20 includes a pair of combined air/water nozzle assemblies 40 configured to produce a controllable mist of water droplets. As will be explained in greater detail below, the portable misting system 20 allows an adjustable amount of water droplets to be mixed with a steady flow of air in the combined air/water nozzle assemblies 40. This adjustment feature advantageously allows the concentration or density of the water droplets in the mist to be selectively controlled to a desired level. The combined air/water nozzle assemblies 40 may also be referred to as dry misting nozzle assemblies.

The portable misting system 20 is for outdoor enthusiasts and may be used in a variety of different applications. Such applications include golf carts, tailgating events, soccer games, boats, camping and RV sites, for example. The portable misting system 20 has a compact design with flexible mounting (top or bottom). The illustrated embodiment has dimensions of 14 inches by 5.5 inches by 3 inches, for example.

The illustrated portable misting system 20 is not limited to a pair of combined air/water nozzle assemblies 40. The number of combined air/water nozzle assemblies 40 may vary based on the size of the housing 30 for the intended application. In some applications, the misting system 20 may have a single combined air/water nozzle assembly 40. In other applications, the portable misting system 20 may have more than two combined air/water nozzle assemblies 40.

The portable misting system 20 includes a housing 30 with a bottle holder 32 carried by the housing. The housing 30 and bottle holder 32 may be formed as a single item, or they may be formed as separate items with the bottle holder 32 being attached to the housing 30. Alternatively, when formed separately, the bottle holder 32 may be positioned away from the housing 30.

The bottle holder 32 is configured to carry a water bottle 34 which provides water for the portable misting system 20. The water bottle 34 may also be referred to as a water tank or water reservoir. An example size of the water bottle 34 is 32 ounces. This amount of water allows the portable misting system 20 to provide mist for about 2-3 hours depending on the level of water drop let concentration in the mist.

Inside the water bottle 34 is a centrifugal water pump 50. Alternatively, the water pump 50 may be located external to the water bottle 34. The pressure of the water provided by the centrifugal water pump 50 is low, typically less than 3 PSI, for example. Alternatively, a higher pressure water pump may be used. The centrifugal water pump 50 is powered by a 12 volt DC power source, such as a battery 70. Electrical connection 64 extends between the battery 70 and the water pump 50.

Coupled to the water pump 50 is a water tube 52. Water passes from the water pump 50 through the water tube 52 to a check valve 56. The check valve 56 prevents water from flowing back to the water pump 50. A pair of water tubes 58 is coupled between the check valve 56 and the pair of combined air/water valve assemblies 40.

An air pump 60 is carried by the housing 30. The air pump 60 provides a steady flow of air to the combined air/water valve assemblies 40. The pressure of the air is low, typically less than 30 PSI, for example. Alternatively, a higher pressure air pump may be used. The air pump 60 is also powered by a 12 volt DC power source, such as a battery 70. Electrical connection 66 extends between the battery 70 and the air pump 60. A pair of air tubes 62 is coupled between the air pump 60 and the pair of combined air/water valve assemblies 40.

A power button or power switch 72 for the portable misting system 20 is on the front of the housing 30. Although not illustrated, the portable misting system 20 may include a voltage regulator to regulate a DC voltage provided to the portable misting system 20. For example, if the the portable misting system 20 is installed on a golf cart, then a higher DC voltage used to power the golf cart may be regulated to a lower DC voltage to power the portable misting system 20, such as 12 volts.

Each combined air/water valve assembly 40 is carried by a vent 80 which is also on the front of the housing 30. The illustrated vent 80 is an eyeball vent which allows the output of the combined air/water valve assembly 40 to be positioned at a desired angle.

Each vent 80 is independently steerable so as to direct cooling air to a desired location. A fan 90 is carried by the housing 30 to direct the mist outwards from the vents 80. The fan is sized to provide an air flow of about 175 CFM, for example. The fan 90 is also powered by a 12 volt DC power source, such as a battery 70. Electrical connection 68 extends between the battery 70 and the fan motor 96. A fan guard 92 covers a fan opening on the backside of the housing 30 to protect objects from coming in contact with the blades of the fan 90.

The portable misting system 20 further includes a controller 74 coupled to the water pump 50 to control the speed of the water pump 50. Selectively controlling the speed of the water pump 50 via a mist control knob 76 on the controller 74 advantageously allows the concentration or density of water droplets to be varied to a desired level. Electrical connection 101 extends from the controller 74 to the water pump 50.

The controller 74 is also coupled to the fan motor 96 of the fan 90 to control the speed of the fan motor 96. Selectively controlling the speed of the fan motor 96 via an air control knob 78 on the controller 74 advantageously allows the flow of air from the fan 90 to be varied to a desired level. Electrical connection 103 extends from the controller 74 to the fan motor 96.

The controller 74 is configured to include a circuit board for control of the water pump 50 and a separate circuit board for control of the fan motor 96. Alternatively, the functions of each circuit board may be combined into a single circuit board.

In other embodiments, electronic control of the water pump 50 may be replaced with a mechanical water flow regulator. The water flow regulator 54 may be configured as a valve, for example. Water would pass from the water flow regulator to the check valve 56.

Figure 4:
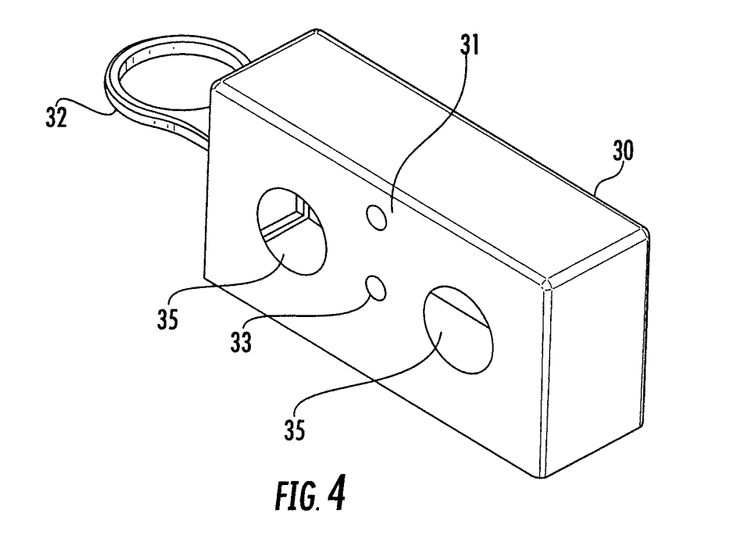
FIG. 4 is a front perspective view of the housing for the portable misting system illustrated in FIG. 1.
Figure 5:
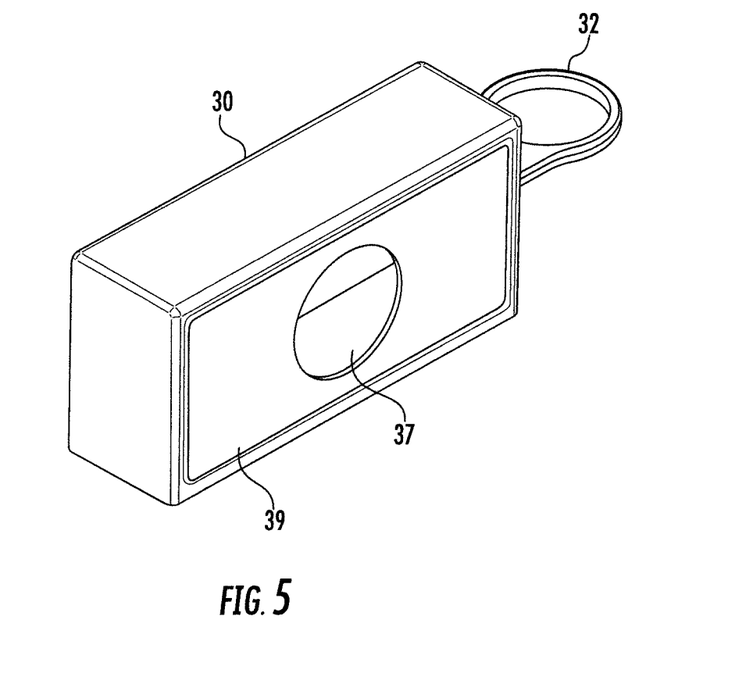
FIG. 5 is a rear perspective view of the housing for the portable misting system illustrated in FIG. 1.

The housing 30 and bottle holder 32 without any of the other components of the misting system 20 are provided in FIGS. 4-5. The front side of the housing 30 includes a cutout 31 for the controller 74, a cutout 33 for the power button 70, and a pair of cutouts 35 for the vents 80. The rear side of the housing 30 includes a cutout 37 for the fan 90. A section 39 of the rear side of the housing 30 is removable so as to allow access therein. The housing 30 and the bottle holder 32 may be formed out of plastic, for example.

Figure 6:
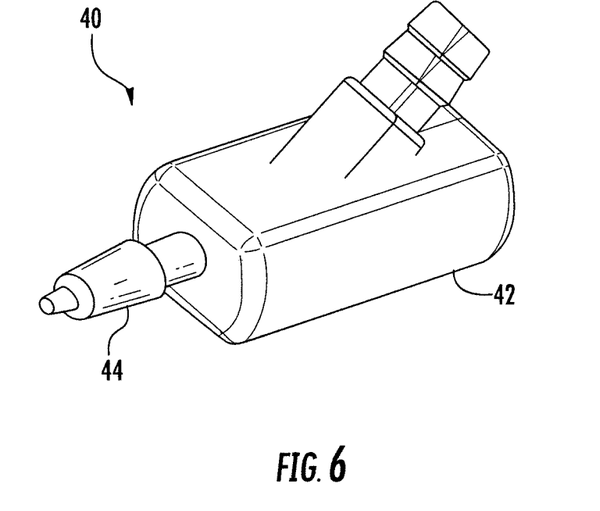
FIG. 6 is a side perspective view of one of the combined air/water nozzle assemblies illustrated in FIG. 1.

The combined air/water valve assemblies 40 will now be discussed in reference to FIGS. 6-8. Each combined air/water valve assembly 40 includes a misting base or nozzle body 42 and a misting nozzle 44. The misting nozzle 44 is coupled to an output of the nozzle body 42. The misting nozzle 44 is easily removable for cleaning.

The nozzle body 42 has a water input 46 and an air input 48. The water input 46 is coupled to water tube 58, and the air input 48 is coupled to air tube 62. The respective water and air inputs 46, 48 are angled with respect to a longitudinal axis 100 extending through the misting base 42. A water channel or water flow pathway 102 within the water input 46 is directed to the output of the misting base 42. Similarly, an air channel or air flow pathway 104 within the air input 48 is directed to the output of the misting base 42.

More particularly, the water flow pathway 102 extends from the water input 46 to the longitudinal axis 100, and with the water flow pathway 102 further extending along the longitudinal axis 100. A nozzle body chamber 106 is downstream from an end of the water flow pathway 102. The air flow pathway 104 extends from the air input 48 to the nozzle body chamber 106 at an angle with respect to the longitudinal axis 100. A misting nozzle opening 108 extends from the nozzle body chamber 106 along the longitudinal axis 100 to an external wall 43 of the nozzle body 42.

Figure 7:
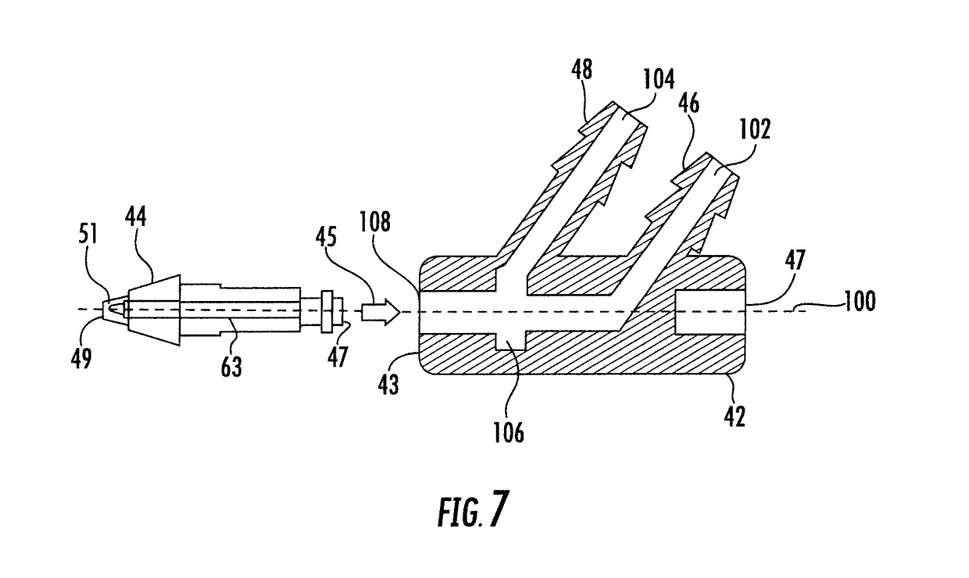
FIGS. 7 and 8 are cross-sectional exploded views of the combined air/water nozzle assembly illustrated in FIG. 6.
Figure 8:
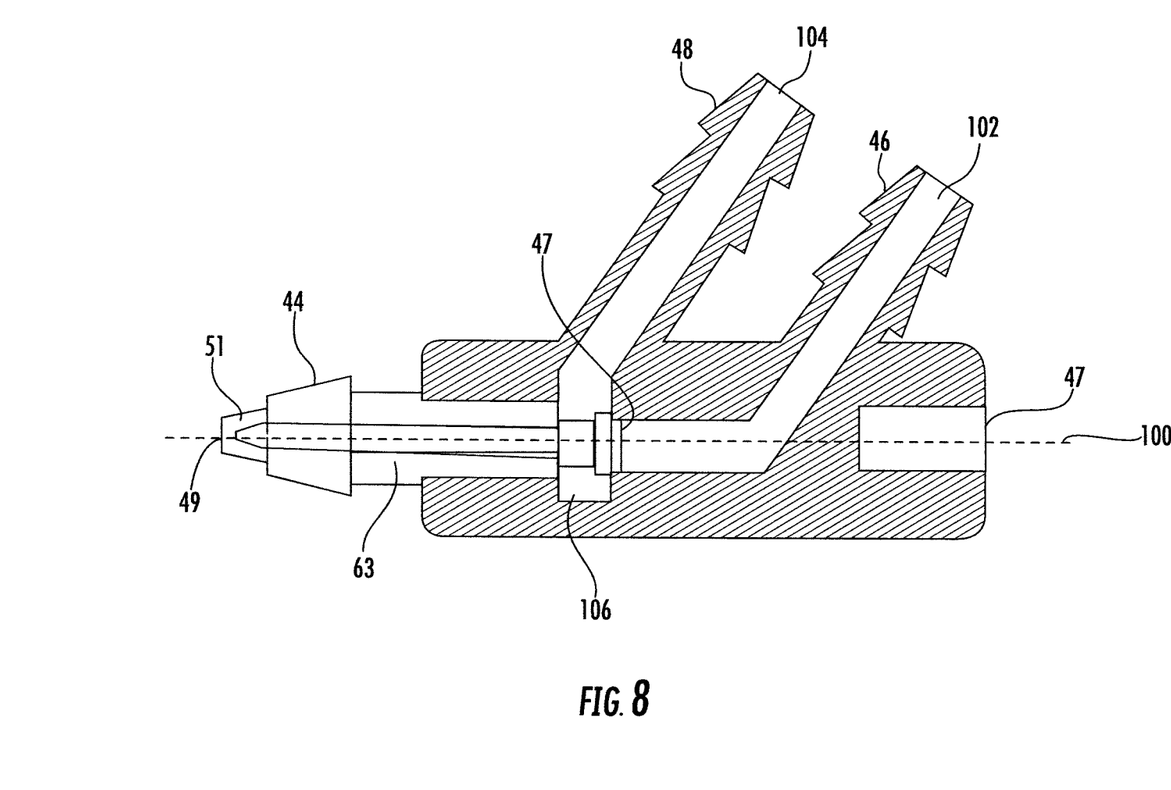

The misting nozzle 44 is coupled to the nozzle body 42 via the misting nozzle opening 108 as indicated by arrow 45 in FIG. 7. The misting nozzle 44 has an input 47 extending to the nozzle body chamber 106 of the nozzle body 42, and a restricted output 49 extending from the external wall 43 of the nozzle body 42.

The misting nozzle 44 is configured to provide a misting chamber 51 where the flow of air comes in contact with the flow of water droplets so as to create a mist that is to pass through the restricted output 49 of the misting nozzle 44.

The water droplets travel from the water flow pathway 102 through an insert 63 within the misting nozzle 44. The output of the insert 63 is in the misting chamber 51. The flow of air from the air flow pathway 104 travels into the nozzle body chamber 106 and into the misting nozzle 44 but along the outside of the insert 63 where the flow of air is directed to the misting chamber 51. The air flow pathway 104 extending through the misting nozzle 44 thus surrounds the water flow pathway 102 within the insert 63.

The portable misting system 20 allows an adjustable amount of water to be mixed at low pressure with a steady flow of air in the misting base 42. This is based on the misting base 42 being configured to simultaneously receive air and water. The water adjustment feature of the portable misting system 20 advantageously allows a desired amount of water in the mist.

Figure 9:
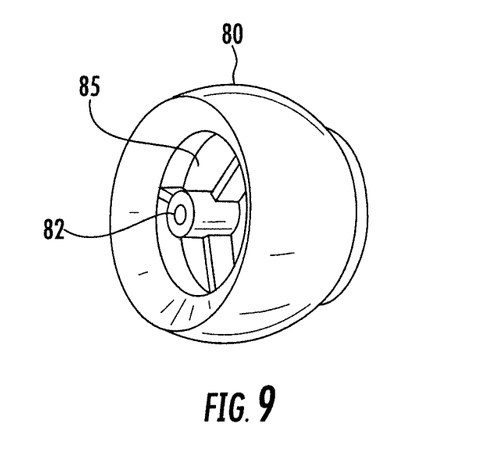
FIG. 9 is a side perspective view of one of the vents illustrated in FIG. 1.

The end of the misting base 42 opposite the misting nozzle 44 has a threaded opening 47. A threaded mounting shaft may be used to secure the misting base 42 via the threaded opening 47 to the vent 80. More particularly, the vent 80 may include a threaded opening 82, as illustrated in FIG. 9, to receive the mounting shaft. Of course, other types of attachments may be used to secure the combined air/water valve assemblies 40 to their respective vents 80.

Figure 10:
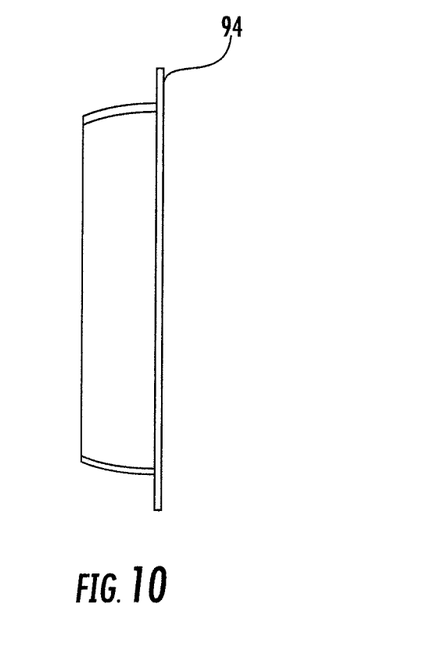
FIG. 10 is a side perspective view of a vent holder carried by the housing and used to hold the vent illustrated in FIG. 9.

Air from the fan 90 flows through the vent openings 85 surrounding the combined air/water valve assembly 40 to direct the mist outwards from each vent 80. The vent 80 is inserted into a vent holder 94 which is to be carried by the housing 30 within the venting opening 35, as illustrated in FIG. 10. Positioning of the vent 80 within the vent housing 94 allows the output of the combined air/water valve assembly 40 to be positioned at a desired angle.

In addition, the illustrated portable misting system 20 is not to be viewed as limiting. Other embodiments of a portable misting system 20 utilizing an adjustable amount of water droplets to be mixed with a steady flow of air in the combined air/water nozzle assemblies 40 may be provided, as readily appreciated by those skilled in the art.

For example, if the available installation footprint is limited, then the above portable misting system 20 may be provided without the housing 30 and bottle holder 32. In this embodiment, the other components of the misting system 20 are positioned within the available space for providing the mist.

Figure 11:
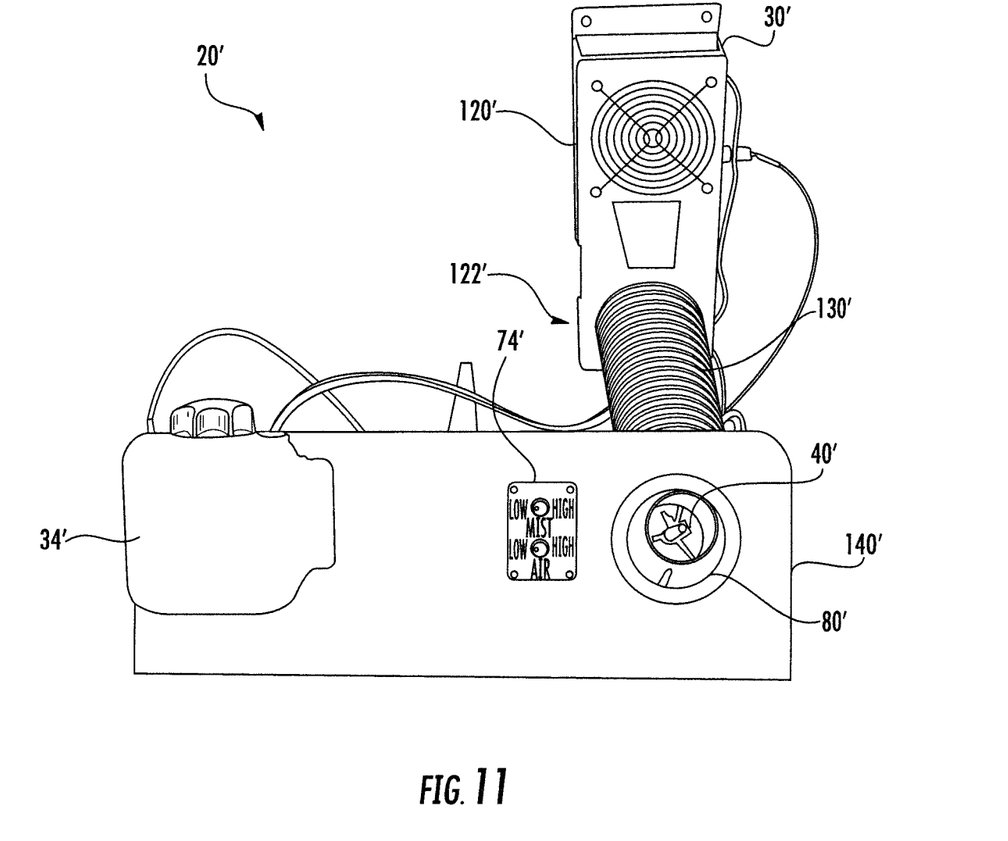
FIG. 11 is a front perspective view of another embodiment of the portable misting system in accordance with the present disclosure.

In yet another embodiment of the portable misting system 20', reference is directed to FIG. 11. This embodiment may be installed within a boat, for example.

The housing 30' has a fan input opening 120' and a fan output opening 122' adjacent to the fan input opening. A fan 90' is carried by the housing 30' and is aligned with the fan input opening 120'. An air duct 130' having a first end is coupled to the fan output opening 122', and a second end extends away from the housing 30', such as towards the dash 140' of the boat.

An air pump 60' is carried by the housing 30' to provide a flow of air. A water reservoir 34' separate from the housing 30' is to hold a supply of water. Even though the water reservoir 34' is shown on the front of the dash 140', it may be mounted on a backside of the dash 140'.

A water pump 50' is carried by the water reservoir 34' to provide a flow of water droplets. A vent 80' is coupled to the second end of the air duct 130'. An air/water nozzle assembly 40' is carried by the vent 80', and is as described above. The controller 74' is mounted on the dash 140'.

Many modifications and other embodiments of the disclosure will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed:

1. A portable misting system comprising:
    a housing;
    an air pump carried by said housing and configured to provide a flow of air;
    a water reservoir carried by said housing and configured to hold a supply of water;
    a water pump carried by said water reservoir and configured to provide a flow of water droplets; and
    at least one air/water nozzle assembly carried by said housing and comprising:
        a nozzle body having an air input coupled to said air pump to receive the flow of air, and a water input coupled to said water pump to receive the flow of water droplets, said nozzle body having a longitudinal axis extending therethrough and further including
            a water flow pathway extending from the water input to the longitudinal axis, and with the water flow pathway further extending along the longitudinal axis,
            a nozzle body chamber downstream from an end of the water flow pathway,
            an air flow pathway extending from the air input to the nozzle body chamber, and
            a misting nozzle opening extending from the nozzle body chamber along the longitudinal axis to an external wall of said nozzle body; and a misting nozzle coupled to an output of said nozzle body via the misting nozzle opening.

2. The portable misting system according to claim 1 wherein said misting nozzle further includes:
an input extending to the nozzle body chamber of said nozzle body; and
a restricted output extending from the external wall of said nozzle body.

3. The portable misting system according to claim 2 wherein said misting nozzle is configured to provide a misting chamber where the flow of air comes in contact with the flow of water droplets so as to create a mist that is to pass through the restricted output of said misting nozzle.

4. The portable misting system according to claim 1 wherein the air flow pathway extends to the nozzle body chamber at an angle with respect to the longitudinal axis.

5. The portable misting system according to claim 1 further comprising a controller carried by said housing to control a speed of said water pump.

6. The portable misting system according to claim 1 further comprising:
at least one vent carried by said housing, with said at least one air/water nozzle assembly coupled to said at least one vent;
a fan carried by said housing and configured to provide a flow of air to said at least one vent that is separate from the flow of air from said air pump; and
a controller carried by said housing to control a speed of said fan.

7. The portable misting system according to claim 1 further comprising:
a battery carried by said housing to power said air pump and said water pump; and
a power switch carried by said housing and coupled to said battery.

8. A portable misting system comprising:
an air pump configured to provide a flow of air;
a water reservoir configured to hold a supply of water;
a water pump carried by said water reservoir and configured to provide a flow of water droplets; and
at least one air/water nozzle assembly comprising a nozzle body and a misting nozzle coupled thereto, with said nozzle body having a longitudinal axis extending therethrough, and including:
a water flow pathway extending along the longitudinal axis from a water input to the longitudinal axis,
a nozzle body chamber downstream from an end of the water flow pathway,
an air flow pathway extending from an air input to the nozzle body chamber, and
a misting nozzle opening extending from the nozzle body chamber along the longitudinal axis to an external wall of said nozzle body, with said misting nozzle being coupled to said nozzle body via the misting nozzle opening.

9. The portable misting system according to claim 8 wherein said misting nozzle further includes:
an input extending to the nozzle body chamber of said nozzle body; and
a restricted output extending from the external wall of said nozzle body.

10. The portable misting system according to claim 9 wherein said misting nozzle is configured to provide a misting chamber where the flow of air comes in contact with the flow of water droplets so as to create a mist that is to pass through the restricted output of said misting nozzle.

11. The portable misting system according to claim 8, wherein the air flow pathway extends to the nozzle body chamber at an angle with respect to the longitudinal axis.

12. The portable misting system according to claim 8 further comprising:
at least one vent coupled to said at least one air/water nozzle assembly; and
a fan configured to provide a flow of air to said at least one vent that is separate from the flow of air from said air pump.

13. A portable misting system comprising
a housing having a fan input opening and a fan output opening adjacent to the fan input opening;
a fan carried by said housing and aligned with the fan input opening;
an air duct having a first end coupled to the fan output opening of said housing, and a second end extending away from said housing;
an air pump carried by said housing and configured to provide a flow of air;
a water reservoir separate from said housing and configured to hold a supply of water;
a water pump carried by said water reservoir and configured to provide a flow of water droplets;
a vent coupled to the second end of said air duct; and
an air/water nozzle assembly carried by said vent and comprising:
a nozzle body having an air input coupled to said air pump to receive the flow of air, and a water input coupled to said water pump to receive the flow of water droplets, said nozzle body having a longitudinal axis extending therethrough and further including
a water flow pathway extending from the water input to the longitudinal axis, and with the water flow pathway further extending along the longitudinal axis,
a nozzle body chamber downstream from an end of the water flow pathway,
an air flow pathway extending from the air input to the nozzle body chamber, and
a misting nozzle opening extending from the nozzle body chamber along the longitudinal axis to an external wall of said nozzle body; and
a misting nozzle coupled to an output of said nozzle body via the misting nozzle opening.

14. The portable misting system according to claim 13 wherein said misting nozzle further includes:
an input extending to the nozzle body chamber of said nozzle body; and
a restricted output extending from the external wall of said nozzle body.

15. The portable misting system according to claim 13 wherein the air flow pathway extends to the nozzle body chamber at an angle with respect to the longitudinal axis.

16. The portable misting system according to claim 13 further comprising a controller configured to control a speed of said fan and a speed of said water pump.

17. The portable misting system according to claim 13 further comprising:
a battery carried by said housing to power said fan, said air pump and said water pump; and
a power switch separate from said hosing and coupled to said battery.

* * * * *